May 9, 1967    L. P. BANDERAS ET AL    3,318,316
PLASTIC FILTER FOR CIGARETTES
Filed Nov. 4, 1964
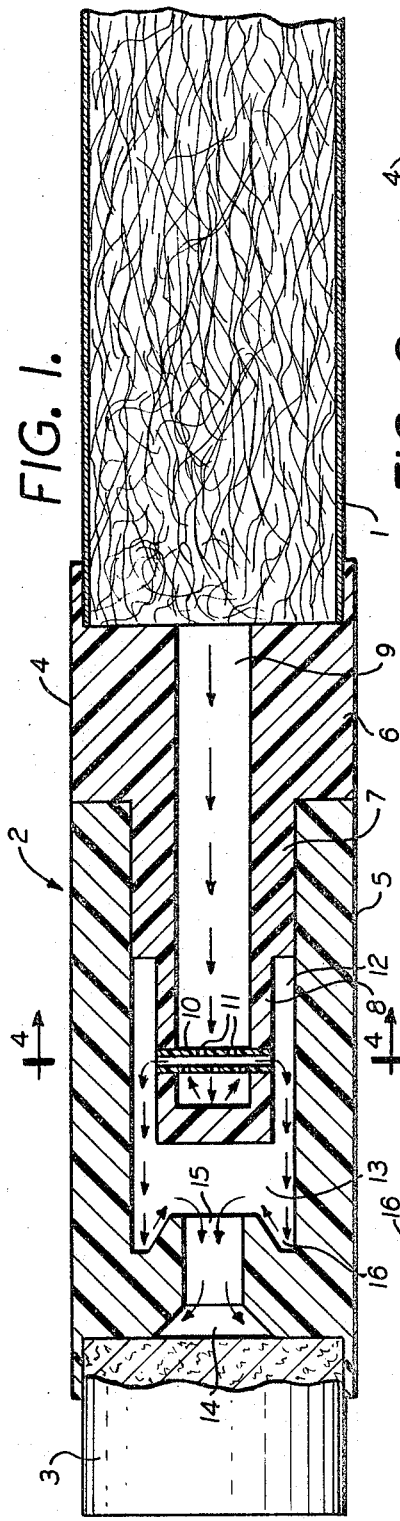
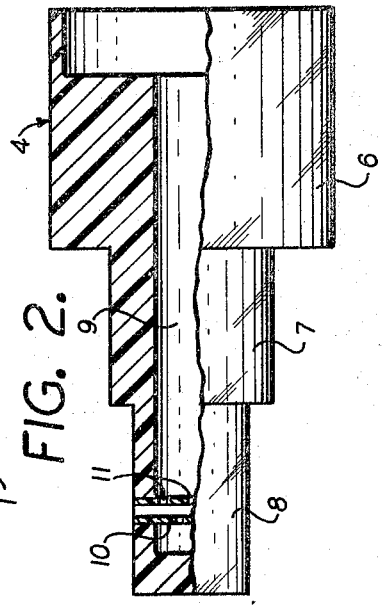
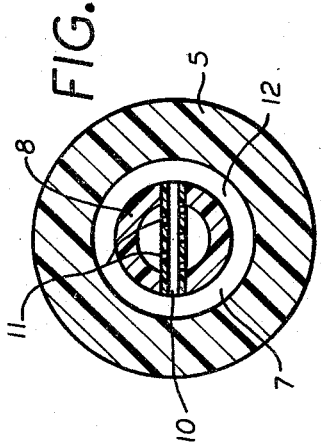
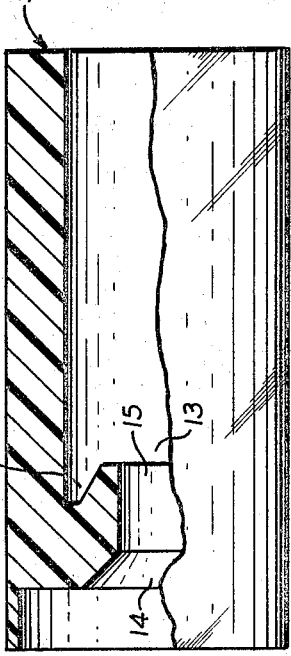
INVENTORS
LUIS PARRA BANDERAS
LEON SEVILLA COHEN
JOSE SEVILLA COHEN
SERGIO JIMENEZ CAZARES
BY
ATTORNEY.

3,318,316
PLASTIC FILTER FOR CIGARETTES

Luis Parra Banderas, Norte 74, 3532 Col. La Joya; Leon Sevilla Cohen, Garcia Diego 188, Dep. 3, Col. de los Doctores; Jose Sevilla Cohen, Romero de Terreros 1056, Dep. 17, Col. Narvarte; and Sergio Jimenez Cazares, Calzada de la Viga 1802, Dep. 4, Col. Heroes de Churubusco, all of Mexico City, Mexico
Filed Nov. 4, 1964, Ser. No. 408,873
3 Claims. (Cl. 131—187)

The present invention relates to a plastic filter for cigarettes.

Filters are known which are designed to filter out the damaging ingredients or particles of the smoke inhaled from cigarettes.

It is one object of the present invention to provide a plastic filter for cigarettes, which avoids the drawbacks and insufficiencies of known filters.

It is another object of the present invention to provide a plastic filter for cigarettes, which comprises two main cylindrical members, namely a first cylindrical member formed integrally of three cylinders having increasing diameters from one end to the other end and a second cylindrical member which is hollow and has an inner diameter complementary to the outer diameter of the intermediate cylinder of the first cylindrical member.

It is still another object of the present invention to provide a plastic filter for cigarettes, which has a blind central channel in the above-named first cylindrical member and provides an annular space between the cylinder of lowest outer diameter of the first cylindrical member and the inner diameter of the second cylindrical member, whereby the third cylinder of smallest diameter has a hollow cross tube member which is perforated and receives the smoke from the central channel of the first cylindrical member to feed the same through perforations of the cross tube member into the annular chamber provided between the first cylindrical member and the second cylindrical member.

With these and other objects in view, which will become apparent in the following detailed description, the present invention will be clearly understood in connection with the accompanying drawings, in which:

FIG. 1 is an axial section of a portion of a cigarette to which the filter has been attached with a plastic filter and adjoining cellulose filter;

FIG. 2 is an axial section of a first cylindrical member with parts shown in elevation;

FIG. 3 is an axial section of a second cylindrical member with parts shown in elevation; and FIG. 4 is a section along the lines 4—4 of FIG. 1.

Referring now to the drawings, and in particular to FIG. 1, the cigarette filter designed in accordance with the present invention comprises a conventional cigarette portion 1, a plastic filter 2 secured by any suitable means to the cigarette portion 1 and at the opposite end the plastic filter 2 has secured thereto a cellulose filter 3 of conventional structure.

The present invention is particularly concerned with the plastic filter 2, which will now be described in greater detail.

The plastic filter 2 comprises two complementary cylindrical members 4 and 5.

The cylindrical member 4 comprises a cylindrical body formed integrally of three cylinders having different outer diameters, namely a first cylinder 6 having largest diameter, a second cylinder 7 having somewhat reduced outer diameter and a third cylinder 8 having smallest diameter. The cylindrical member 4 has a centrally disposed blind channel 9, which is open at the end engaging the cigarette portion 1 and is blind at the opposite end.

The cylinder of smallest diameter 8 is equipped with a crosswise disposed tube 10 which has perforations 11 to permit the smoke to enter into the tube 10 from the channel 9 and to escape from the outer periphery of the third cylinder 8 of smallest diameter.

The second cylindrical member 5 has an outer diameter which is preferably substantially identical with the outer diameter of the first cylinder of largest diameter of the first cylindrical member 4, while its inner diameter is substantially identical with the outer diameter of the second cylinder 7 of the first cylindrical member 4.

By this arrangement the cylinder 5 fits exactly over the middle cylinder 7 of the first cylindrical member 4 and upon mounting the second cylindrical member 5 on the first cylindrical member 4, one end of the cylindrical member 5 abuts one end face of the first cylinder 6 of the first cylindrical member 4.

The second cylindrical member 5 is of a length greater than the combined length of the second cylinder 7 and the third cylinder 8 and due to the reduced diameter of the cylinder 8, defines an annular chamber 12 between the inner face of the cylindrical member 5 and the outer face of the cylinder 8. In addition, the annular chamber 12 terminates in a cylindrical chamber 13 disposed at the remote end of the cylindrical member 5.

The cylindrical member 5 is open at its end which engages the cellulose filter 3.

The cylindrical member 5 has at its end engaging the cellulose filter 3 a funnel-shaped opening 14 which terminates in a cylindrical channel portion 15. A projection is provided at the inner end of the cylindrical channel portion 15, in order to extend this channel portion 15 and to provide an annular pocket space 16 to locate any particles deposited from the inhaled smoke, as tar particles, or the like. In this manner, an escape of the deposited particles is more or less prevented. The plastic filter for cigarettes, designed in accordance with the present invention, operates in the following manner:

When suction is exerted by the smoker, a vacuum is produced in the annular chamber 12 and the cylindrical chamber 13. Due to the effect of the vacuum, the smoke inhaled through the channel 9 is accelerated and enters through the perforations 11 and into the tube 10 and then into the annular chamber 12, as well as the cylindrical chamber 13. Due to the acceleration of the escaping smoke, a deposit will take place on the inner wall of the cylindrical member 5 and particularly in the pocket formed at the forward end of the cylindrical member 5, while the gases escape through the cylindrical channel 15 and then through the funnel-shaped opening 14 of the cylindrical member 5 to enter the cellulose filter 3 where an additional filtering takes place.

While we have disclosed one embodiment of the present invention, it is to be understood that this embodiment is given by example only and not in a limiting sense, the scope of the present invention being determined by the objects and the claims.

We claim:

1. In a filter cigarette, a plastic filter comprising
   a first cylindrical member, and
   a second cylindrical member,
   said first cylindrical member including integrally a first cylinder of largest outer diameter, a second cylinder of median outer diameter and a third cylinder of smallest outer diameter,
   said first cylindrical member having a first cylinder end at said first cylinder and a third cylinder end at said third cylinder and having a blind axial bore extending throughout the length of said first, second and third cylinders open at said first cylinder end engaging a cigarette portion and closed at said third cylinder end, a tube disposed transversely in said third cylinder and terminating at the periphery of the latter, said tube having a plurality of perforations to provide communication between said axial bore and the space surrounding said third cylinder, said second cylindrical member having an outer diameter substantially identical with that of said first cylinder of said first cylindrical member and an inner diameter substantially identical with said outer diameter of said second cylinder of said first cylindrical member and having an axial length greater than that of said second and third cylinders together, said second cylindrical member having a first end and a second end, said first cylinder of said first cylindrical member having an abutting end adjacent said second cylinder, said first end of said second cylindrical member engaging said abutting end of said first cylinder of said first cylindrical member, and said second cylindrical member has an opening at its second end to engage a cellulose filter.

2. The filter cigarette, as set forth in claim 1, wherein said second end of said second cylindrical member includes an end wall having an outer end and an inner end and having said opening therethrough, and said opening of said second cylindrical member is of funnel-shape, having its widest diameter at said outer end of said end wall.

3. The filter cigarette, as set forth in claim 1, wherein said second end of said second cylindrical member includes an end wall having an outer end and an inner end and having said opening therethrough, and said end wall defining an inner projection at its inner end projecting into said second cylindrical member to form an annular pocket thereabout.

References Cited by the Examiner

UNITED STATES PATENTS

| 214,586 | 4/1879 | Riedel | 131—211 X |
| 1,827,412 | 10/1931 | Welch | 131—211 |
| 1,885,689 | 11/1932 | Dorschel | 131—211 |
| 1,897,065 | 2/1933 | Martin | 131—229 |
| 2,098,161 | 11/1937 | Pilant | 131—198 |
| 2,954,783 | 10/1960 | Lebert. | |
| 3,127,373 | 3/1964 | Guttag | 131—10 X |
| 3,163,168 | 12/1964 | Lytton | 131—212 X |

FOREIGN PATENTS

| 16,330 | 12/1886 | Great Britain. |
| 1,511 | 1/1892 | Great Britain. |
| 19,238 | 9/1908 | Great Britain. |

SAMUEL KOREN, *Primary Examiner.*

JOSEPH S. REICH, *Examiner.*